No. 804,355. PATENTED NOV. 14, 1905.
W. L. WATERS.
DYNAMO ELECTRIC MACHINERY.
APPLICATION FILED DEC. 5, 1904.
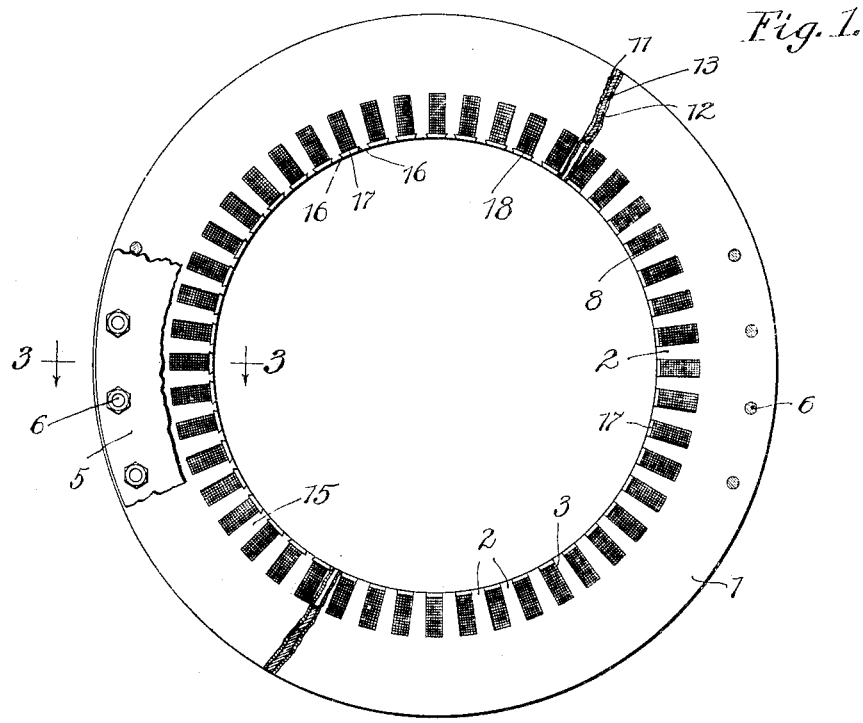
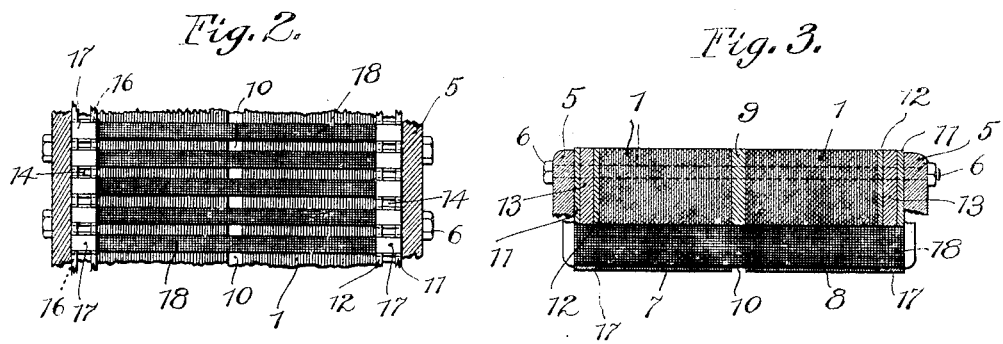
Witnesses:
Leonard W. Novander
John Stahr
Inventor
William L. Waters
By Charles A. Brown
Attorney

UNITED STATES PATENT OFFICE.

WILLIAM L. WATERS, OF MILWAUKEE, WISCONSIN.

DYNAMO-ELECTRIC MACHINERY.

No. 804,355.  Specification of Letters Patent.  Patented Nov. 14, 1905.

Application filed December 5, 1904. Serial No. 235,459.

*To all whom it may concern:*

Be it known that I, WILLIAM L. WATERS, a subject of the King of England, residing at Milwaukee, in the county of Milwaukee and State of Wisconsin, have invented a certain new and useful Improvement in Dynamo-Electric Machinery, of which the following is a full, clear, concise, and exact description, reference being had to the accompanying drawings, forming a part of this specification.

My invention relates to dynamo-electric machines; and its object is to provide improved means for holding the coils thereof within slots.

My invention is particularly adapted for holding the coils of the stator of induction-motors within their slot.

The usual practice for holding the coils in position has been by means of wedges, which engaged slots cut into the edges of the teeth and which extended along the entire length of the slots. This arrangement for holding the coils is very disadvantageous, particularly where the teeth are very narrow, as the teeth are greatly reduced in section owing to these slots, which means a considerable increase in the reluctance of the magnetic circuit.

I provide means for holding the coils in position which avoids the cutting of grooves in the teeth, heretofore necessary, for the wedges. I employ end plates which engage the armature laminations, but in which end plates the teeth are provided with these grooves. Short wedges engage the grooves in these teeth and by extending over the ends of the coils afford sufficient means for securely holding the coils or windings within their slots, this being particularly true in stationary armatures or field-frames, where the coils or windings are not subjected to centrifugal forces. Thus the coils are securely held in their slots and at the same time the reluctance of the magnetic circuit is not increased.

My invention will be best understood with reference to the accompanying drawings, in which—

Figure 1 is an end elevation of an induction-motor stator. Fig. 2 is an enlarged developed view looking from the interior of the stator, and Fig. 3 is a sectional view taken on line 3 3 of Fig. 1.

The stator consists of the laminations 1, having teeth 2 and assembled to form the slots 3. End plates or rings 11 and 12, which may be heavy brass stampings, engage the ends of the assembled core, and clamping-frames 5 engage the outside of the clamping-rings, the clamping frames, rings, and laminations for the core being all securely clamped together by means of bolts 6. The core part may be divided into two parts 7 and 8, separated by a spacing-ring 9, which leaves a ventilating air-space 10 between the parts. A single end brass ring may be used at each side of the core instead of the two rings 11 and 12; but when two rings are employed they are separated by a distance-ring 13 to leave a ventilating air-space 14. The brass rings are also provided with teeth 15, registering with the teeth of the laminations. These teeth, however, are provided at their ends with side grooves 16 for the reception of short wedges 17. The teeth of the laminations, however, are not provided with such grooves, but are entirely continuous. The coils or windings 18 are formed or arranged to snugly engage in the slots, and when in position the short wedges 17 are driven into the grooves 16 to be disposed over the ends of the coils or windings and serve thus to hold the coils or windings within the grooves. The coils or windings, therefore, by having a fairly tight fit in the slots do not need much supporting, and these short wedges engaging at their ends are sufficient to hold them securely in position. By rendering it unnecessary with this manner of securing the coils to cut grooves along the entire length of the teeth all the metal otherwise cut away is saved and the reluctance of the magnetic circuit will not be increased.

I thus provide a very simple means and arrangement for holding the coils in their slots without increasing the magnetic reluctance through the teeth.

I claim as new and desire to secure by Letters Patent—

1. In a magnetic frame, the combination with teeth in said frame having unbroken edges throughout their entire length, of end plates for said frame, having teeth registering with the teeth of the frame, side grooves at the ends of the teeth in said end plates, coils disposed in the slots formed between the teeth of the frame and the end plates, and short wedges engaging the side grooves of the end plates and over the ends of the coils for retaining the coils within the slots.

2. The combination with a magnetic ring provided with teeth about its periphery, of end plates engaging said magnetic ring and provided with teeth registering with the teeth of the magnetic ring, the teeth of said magnetic ring having unbroken faces throughout their entire length, side grooves about the ends of the faces of the teeth in said end plates, and wedges for engaging in said grooves, said wedges engaging the ends of the coils in the slots between said teeth for retaining the coils in position.

3. In a dynamo-electric machine, the combination with a field-frame provided with teeth having unbroken straight surfaces throughout their entire length, of end plates for said field-frame provided with teeth registering with the field-frame teeth, grooves cut in the side walls of the end-plate teeth at the ends thereof, and short wedges for engaging in said grooves, said wedges engaging the ends of the coils disposed in said grooves to retain said coils in position.

4. In a dynamo-electric machine, the combination with an armature provided with teeth having straight and unbroken surfaces throughout their entire length, end plates for said armature provided with teeth registering with the armature-teeth, grooves cut in the side walls of the end-plate teeth near the ends thereof, and short wedges for engaging said grooves, said wedges being disposed over the ends of coils in said grooves and serving to retain said coils in position.

5. In a dynamo-electric machine, the combination with a field-frame composed of similar laminations all provided with teeth having unbroken and straight edges, end plates engaging said laminations and provided with teeth registering with the teeth of the laminations, means for clamping said end plates and laminations together, side grooves cut in the ends of the inner edges of the end-plate teeth, and short wedges for engaging in said grooves, said wedges being disposed over the ends of the coils in said grooves for retaining said coils in position.

6. In a dynamo-electric machine, the combination with a magnetic core formed in two parts and composed of laminations provided with teeth having straight unbroken edges, two end plates at each end of the core provided with teeth registering with the lamination-teeth, grooves cut in the inner edges of the end-plate teeth at the ends thereof, short wedges for engaging in said grooves, said wedges being disposed over the ends of the coils in the slots between said teeth for retaining said coils in position, a ventilating-space between the two parts of said core, and a ventilating-space between two end plates at each side of the core.

In witness whereof I hereunto subscribe my name this 1st day of December, A. D. 1904.

WILLIAM L. WATERS.

Witnesses:
　JOHN E. HUBEL,
　W. S. MAY.